United States Patent [19]

Lukasavage

[11] 4,347,703
[45] Sep. 7, 1982

[54] RANKINE CYCLE SYSTEM EMPLOYING SEASONAL TEMPERATURE VARIATIONS

[76] Inventor: William Lukasavage, P.O. Box 340, Great Meadow, N.J. 07838

[21] Appl. No.: 61,629

[22] Filed: Jul. 27, 1979

[51] Int. Cl.³ .............................................. F03G 7/02
[52] U.S. Cl. .................................... 60/641.6; 60/692; 60/641.1; 62/59; 62/74; 62/412
[58] Field of Search .................... 417/417; 415/49, 90; 60/641.1, 641.6, 690, 692; 62/59, 66, 74, 406, 410, 412, 430, 434, 340; 165/45, 104 S

[56] References Cited

U.S. PATENT DOCUMENTS

| | | | |
|---|---|---|---|
| 80,063 | 7/1868 | Egbert | 62/74 |
| 665,389 | 1/1901 | Bosmann | 62/434 X |
| 738,762 | 9/1903 | Bloss | 62/59 X |
| 1,053,443 | 2/1913 | Scott | 62/66 |
| 1,297,633 | 3/1919 | Ashley | 62/59 |
| 2,288,003 | 6/1942 | Kleucker | 62/59 X |
| 3,788,091 | 1/1974 | Miller | 60/641 G |
| 3,998,071 | 12/1976 | Barthel | 62/430 |
| 4,166,363 | 9/1979 | Mougin | 60/641 G |

Primary Examiner—Allen M. Ostrager
Assistant Examiner—Stephen F. Husar
Attorney, Agent, or Firm—Ronald G. Goebel

[57] ABSTRACT

The invention provides a novel cold source for a Rankine cycle system which employs the use of cold seasonal temperatures to form an ice bed and which allows insulation of said ice bed from warm seasonal temperatures, the cold source comprising a container having an insulated side wall and an insulated bottom; a ventilated top wall mounted above said side wall, said top wall permitting a flow of external air to said container; means associated with said top wall for controlling the flow of external air to said reservoir; an insulated cover mounted on said top wall, a grate extending across said reservoir above said bottom defining a space for containment of a body of water; and means associated with said reservoir for spraying water into said reservoir. The invention also provides a novel turbine, condenser and evaporator assembly, and a magnetically-actuated fluid pump which may also be used for Rankine Cycle Systems.

10 Claims, 13 Drawing Figures

RANKINE CYCLE SYSTEM EMPLOYING SEASONAL TEMPERATURE VARIATIONS

BACKGROUND OF THE INVENTION

This invention is concerned with a Rankine cycle system employing the use of cold seasonal temperatures to form an ice bed and insulating said ice bed from warm seasonal temperatures to provide a year round cold source for the system.

A Rankine cycle system comprises an assembly of apparatus which makes use of a difference in temperature of a working fluid to produce useful work. Generally such a system comprises a heat source which heats a primary fluid such as water stored in a boiler, an evaporator containing working fluid having a vapor pressure significantly above that of water in contact with the heated primary fluid, a turbine or other engine for converting the kinetic and heat energy of a gas to mechanical work which is operated by vaporized working fluid under pressure from the evaporator, and a condenser associated with a cold source which condenses vaporized working fluid exhausted from the turbine or engine which condensed fluid is returned to the evaporator to complete the cycle.

The efficiency with which the system produces work is largely a matter of how great a difference in temperature exists between the hot and cold sources. The theoretical Carnot efficiency is governed by the equation:

$$\text{Carnot efficiency} = \frac{H.S. (°K.) - C.S. (°K.)}{H.S. (°K.)} \times 10^2$$

wherein H.S. (°K) equals the temperature of the hot source in degrees Kelvin and C.S. (°K) equals the temperature of the cold source in degrees Kelvin. The greater the difference in temperature between the hot and cold sources, the higher the efficiency, viz the larger the percentage of heat energy is converted into work.

In the past, this temperature difference was made as large as possible by burning a fuel such as oil or coal for the heat source of the system and keeping the other side as cool as possible, usually with running water. While the effects of burning a fuel are obvious for providing high temperatures to the heat source the temperature of the cold source is also important and has heretofore been largely overlooked.

Historically, there has never been any serious problem meeting both the heating and cooling requirements for these systems. However, this may not be true in the near future. With the supply of petroleum in question and its eventual exhaustion no longer doubted, a serious problem is presented. Alternate sources of heat such as nuclear, coal, or even wood offer no immediate solution. More exotic alternatives such as geothermal, ocean thermal, solar, wind etc. are either wholly inadequate or severely limited in the extent to which they can be applied. In all cases except nuclear, the prohibitive factors are economic and/or severe geographical restrictions.

With fuel supplies dwindling, it would seem inevitable that Rankine cycles, as well as all heat engines, may receive less and less attention as energy suppliers. However, there yet remains a number of natural environmental sources having temperature differences which can provide near infinite amounts of energy and can be used for Rankine cycle systems. The main drawback to their use lies in the small temperature differences which they offer.

One such system is the government-sponsored project OTEC, or Ocean Thermal Exchange Cycle, which makes use of small differences in temperature found at different depths in some parts of the ocean. Such systems are described in U.S. Pat. Nos. 4,104,883 and 3,986,622.

Another system utilizes the inherent temperature differences of areas of the earth's surface where there are relatively large elevational differences, e.g. a mountain top and the valley below it. Such systems are described in U.S. Pat. No. 3,953,971.

While there exists some debate over what efficiencies can actually be achieved by these systems, even the most optimistic estimates place it at only a few percent due to the relatively small temperature differences.

Moreover, when a small difference in temperature must be used, the walls of the evaporator of the system do not transfer heat rapidly and this quickly causes enormous problems both technically and economically. Because the rate of heat transfer is slow, the surfaces of both the evaporator and the condenser must be increased hundreds or even thousands of times. So, what was originally a simple evaporator and condenser connected through a turbine, becomes a series of enormous pressurized heat exchangers and the cost of the system vastly increases. Add to these problems, severe geographical restrictions and the survival of these systems in rough weather, and it becomes apparent, what difficulties these systems present.

The temperature of the condenser in contact with the cold source is as important as the temperature of the evaporator in contributing to the efficiency of a Rankine cycle system. If the condenser is cooled significantly, e.g. to 0° C., while maintaining the evaporator at room temperature, the turbine or engine can still perform by drawing heat away from the environment. If the condensed working fluid is recycled back to the evaporator, the system will continue to do work as long as the condenser is cooled. If the evaporator is maintained at about 100° C. and the condenser at 0° C., the Carnot efficiency is about 27%. A steam engine, on the other hand, having a boiling temperature of 200° C. and a condenser temperature of 100° C. would have a Carnot efficiency of about 21%. The efficiency of a nuclear power plant is only about 25%.

Thus, it can be seen that by providing a moderately high hot source for a Rankine cycle system and a cold source at the temperature of ice, 0° C., a reasonably efficient system can be obtained.

The present invention provides a Rankine cycle system, employing ice as the cold source, which ice is generated using ambient temperatures available during the cold seasons and stored for use during warmer weather. The hot source can be solar heated water or waste heat from commercial facilities which achieves temperatures of 80° C. or above.

In other aspects of this invention improved apparatus for use in a Rankine cycle system are provided including an evaporator, turbine assembly, and condenser.

To further increase efficiency a freezing point depressant such as an inorganic salt may be added to the ice preferably after it is formed to lower its temperature as low as −60° C., if the cold season supports such temperatures.

SUMMARY OF THE INVENTION

In one embodiment of this invention a cold source for a Rankine cycle system is provided comprising an ice reservoir which allows formation of the ice during the cold seasons and storage of the ice during warm seasons in the ice reservoir under insulating conditions. The ice reservoir comprises a container having:

(a) insulated side walls and an insulated bottom;
(b) ventilated top walls extending upwardly from said side walls comprised of an air permeable material having means for controlling air flow to said reservoir;
(c) an insulated cover mounted atop said ventilated top walls;
(d) means associated with said reservoir for spraying water into said reservoir; and
(e) a grate extending between said side walls above said bottom to form a water space therebetween.

During the cold seasons, that is, those periods in which the air temperature is below about 0° C. (32° F.), water is sprayed into the reservoir by the spraying means while at the same time frigid air is allowed to circulate through the ventilated top walls, thereby forming thin layers of ice which build up to a bed resting on the grate. During the warm seasons, that is, those periods in which the air temperature is above about 0° C. (32° F.), the air flow control means stops the air flow and the reservoir and ice bed is insulated from ambient temperatures by means of the cover, side walls, bottom and air flow control means which may also be comprised of or covered by an insulating material. The condenser of the system is submerged in a body of water in the water space below the grate, the body of water being in constant contact with the lower surface of the ice bed. The body of water is maintained at about 0° C. by virtue of its contact with the ice. The level of water at the water-ice interface is controlled by a spill vent which draws off excess water from the reservoir.

In another embodiment of this invention, an improved evaporator assembly is provided for use with Rankine cycle systems comprising a plurality of evaporator elements, each element consisting of a container having a thin outer shell of oval cross-section or any other configuration which maximizes heat transfer according to the needs of the system. The inside of the container is packed with a fluid dispersing material such as screen, mesh or one or more coils oriented parallel to the outer surfaces of the container. Fluid and vapor manifolds are located at the inlet and outlet ends, respectively, of the evaporator elements. Working fluid entering each evaporator element encounters the fluid dispersing material and is forced to disperse in a thin film over the interior surface of the shell, thereby enhancing heat transfer from the boiler. As the fluid is converted to a vapor, it superheats in its path through the evaporator before being introduced to the turbine or heat engine. A throttle control valve is preferably provided to regulate the amount of working fluid passing to the evaporator elements which is electrically connected with the load in the system and the generating means operated by the turbine and admits more or less working fluid to the evaporator depending on the varying power requirements of the system.

In still another embodiment of this invention, a novel turbine assembly is provided for use in Rankine cycle systems which functions by the deceleration of a gas impinging on it. The turbine comprises a casing, a shaft extending through said casing rotatably supported by bearings; a pair of spaced circular metal plates mounted centrally on said shaft and a plurality of concentric layers of mesh material extending between said plates from the shaft to the periphery of the plates. The spacing between these layers may vary depending on the needs of the system. Vaporized working fluid is introduced to the turbine against the mesh material between the shaft and the periphery of the plates. As the vapor penetrates the first few outer layers of mesh material, its velocity is reduced by transfer of energy to the shaft. Because the succeeding inner layers of mesh material have a lower tangential velocity than the outer layers, the gas is able to transfer more of its kinetic energy to the relatively slower moving mesh material. This action is continued until substantially all the kinetic energy of the gas is transferred to the turbine shaft.

A regulating valve is built into the turbine assembly to regulate gas flow to the turbine in response to differences in pressure between the evaporator and the atmosphere.

In still another embodiment of the present invention, a novel condenser assembly is provided for use with the ice reservoir described above. The assembly comprises a plurality of condenser elements arranged in a radial pattern which are fed by inlet lines from a vapor manifold. Fluid outlets from the elements feed into a common condensate manifold located below the reservoir. Each element may be similar in shape and construction to an evaporator element described above but is generally larger in size.

DETAILED DESCRIPTION OF THE PREFERRED EMBODIMENT

Figure 1:
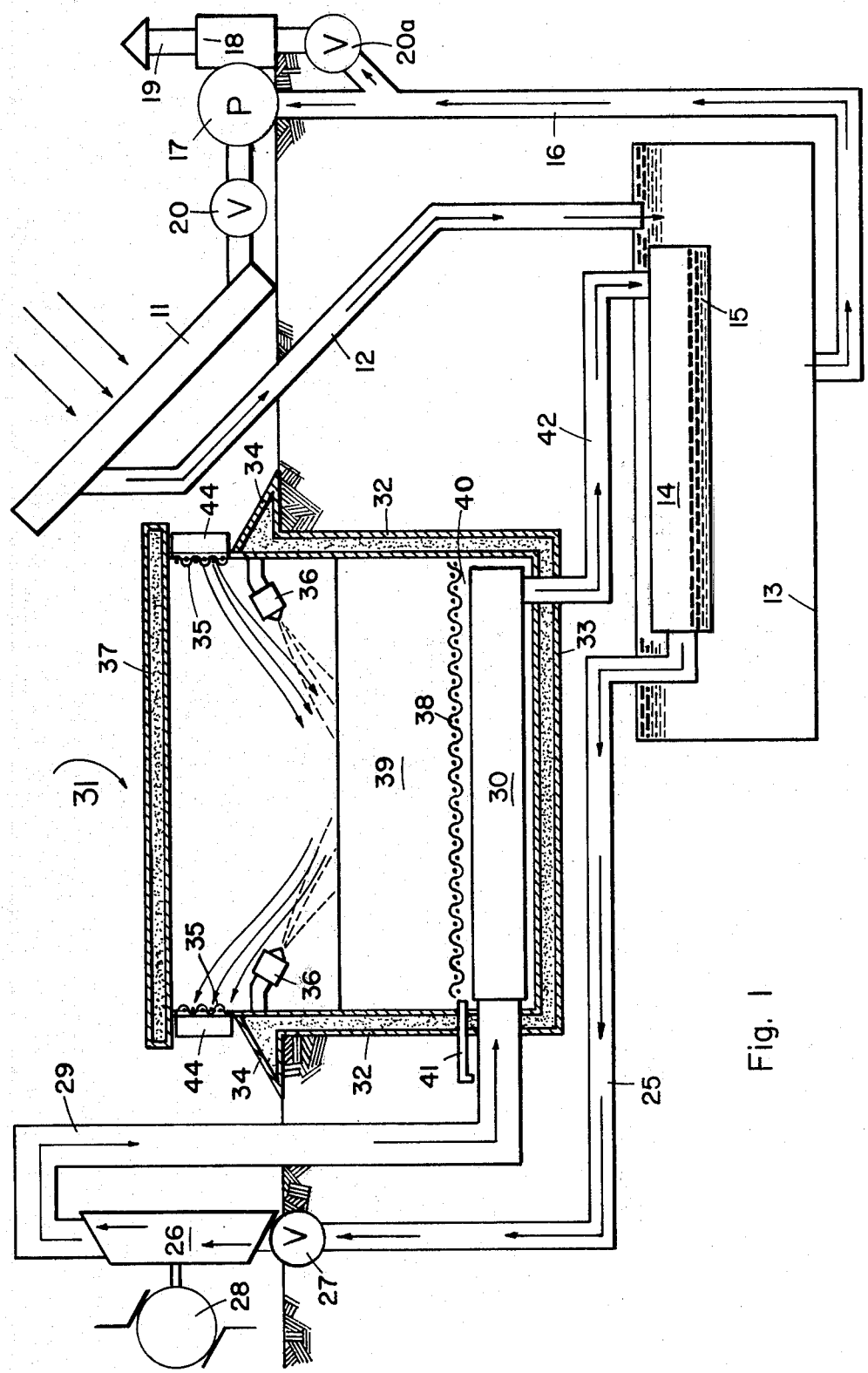
FIG. 1 shows a Rankine cycle system according to this invention including an ice reservoir as a cold source in which ice is formed during the cold seasons and stored during warm seasons and a solar collector as a heat source.

FIG. 1 shows a system of apparatus forming a Rankine cycle which includes a cold source formed during the cold seasons and stored during warm seasons according to this invention. The system may be used to supply electrical power, for example, to a commercial facility or for individual home use. In this system a heat source such as a solar collector 11 extracts energy from sunlight to heat a primary fluid such as water in conduit 12 leading to underground water tank 13. The tank has a capacity sufficient to run the system for several days if the heat source is inactive such as during days of little or no sunlight. A portion of the heat of the primary fluid in tank 13 is transferred to evaporator 14 located within the tank to a secondary or working fluid 15 contained in the evaporator. Cooler primary fluid at the bottom of tank 13 is recycled to the heat source via conduit 16 by means of a thermostatically controlled circulating pump 17. An expansion tank 18 having vent 19 is also provided in conduit 16 to accommodate increases in primary fluid volume. Valve 20a may be located in the line to the expansion tank to eliminate priming of pump 17 in the event of changes in the pressure of the system. The cooler fluid is then recirculated through the solar collector 11 to conduit 12. Valve 20 is used to control flow to the collector.

Figure 2:
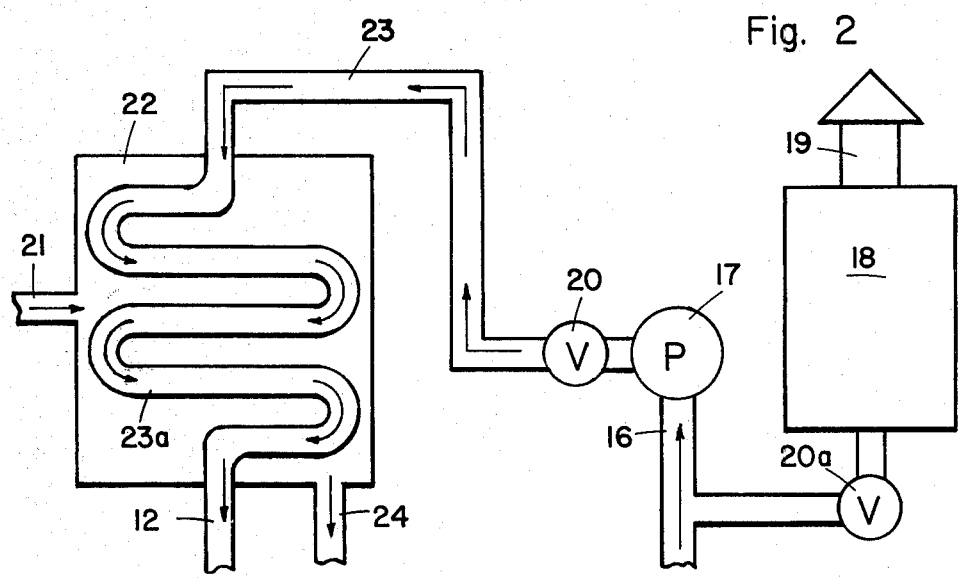
FIG. 2 shows a heat source useful as a substitute or companion to the heat source of FIG. 1.

FIG. 2 shows a heat source useful as a substitute or companion to the solar collector 11 for heating the primary fluid which uses the waste heat from a facility that expends heat-producing fuels such as fossil fuels or nuclear material and exhausts unused heat to the environment. In this scheme, such waste heat is introduced through conduit 21 to heat exchanger 22. Cooler working fluid from tank 13 in line 16, after being pumped by pump 17 through valve 20, flows through conduit 23 where it enters heat exchanger 22 in multi-U-shaped loops 23a to insure optimum contact with the waste heat and then exits the exchanger in conduit 12. The heat exchanged waste heat exhaust exits the heat exchanger in conduit 24.

Referring again to FIG. 1, the working fluid in evaporator 14 is evaporated by the heat transferred to it from the primary fluid. The working fluid can be any low boiling liquid such as a halogenated hydrocarbon. Methylene chloride is particularly preferred since it is less expensive than Freon-type fluids and has no damaging effect upon the upper atmosphere. Methylene chloride has a boiling point of about 100° F. (38° C.) and so offers a pressure of one atmosphere when heated to this temperature. Since the average water temperature in the water tank will always be well above 100° F., the vaporized working fluid is allowed to superheat. However, the pressure in the evaporator can be held constant by a regulating valve associated with the turbine or heat engine which will be described in more detail hereafter. The pressure of the working fluid to the evaporator is not restricted and remains between 2 to 3 atmospheres which allows it to be fed to the evaporators. The vaporized working fluid under one atmosphere of pressure flows through conduit 25 to a device capable of converting the thermal and kinetic energy of the gaseous working fluid to mechanical work such as a turbine 26 or other engine via valve 27. The turbine 26 drives a motor or generator 28 or other device. Exhaust fluid from turbine 26 enters large diameter conduit 29 which leads to condenser 30 located at the bottom of underground ice reservoir 31.

The ice reservoir 31 comprises a container bounded by insulated side walls 32 and an insulated bottom wall 33. The shape of the container is not critical and may be of circular, oval or other rounded geometric form in cross-section. As shown in FIG. 1, the greater portion of the reservoir is located below ground and is supported on the ground surface by outwardly extending shoulders 34 of walls 32. The ice reservoir may also be located completely above ground which will be shown in more detail in connection with FIG. 4. Extending above insulated side walls 32 are ventilated top walls 35 which are comprised of one or more layers of air permeable material such as wire mesh to allow circulation of cold atmospheric air therethrough to the reservoir during the cold seasons as shown by the arrows. This will be shown in more detail in connection with FIGS. 3 and 4. An insulated cover 37 joined to the top walls 35 prevents atmospheric heat from reaching the inside of the reservoir. One or more pairs of thermostatically controlled atomizers 36 are located on the top inside portion of the insulated side walls. These atomizers are connected to a source of water and act to spray a thin film of water into the reservoir as shown by the dotted lines. Such atomizers may also be located in or above the cover 37. At the bottom of the reservoir just above the condenser 30 is a grate 38 extending across the side walls which grate is comprised of a suitably strong metal, for example.

An ice bed 39 forming a substantially permanent cold sink for the system is formed by allowing cold air during the cold seasons to circulate to the inside of the reservoir through one side of a ventilated top wall and out the other as shown by the arrows while at the same time spraying a thin film of water to the reservoir through atomizers 36 as shown by the dotted lines. The total ice bed is formed by the build-up of thin successive films of ice by the cold air flow and water injections. The ice bed is supported above the condenser 30 by grate 38. To stop and continue air flow to the reservoir, air flow control means 44 are provided which will be shown in more detail in FIG. 3. The air flow control means may be covered with or made from an insulating material. During warmer seasons the air circulation and water atomization is halted and the large ice bed thus formed is prevented from melting by the insulated walls 32, bottom 33, cover 37 and the air flow control means which are moved against the ventilated top walls.

The grate 38 represents the sole support for the ice and without its presence the entire mass would slide downward. The grate also acts as a cleat to keep the ice from shifting horizontally by biting into it under its weight. The ice, retained by the grate, is allowed to contact or interface with a relatively shallow body of water 40 at the bottom of the reservoir between the grate 38 and the bottom wall 33. The grate may be supported by support members extending upwardly from bottom wall 33. The condenser 30 is totally submerged in the body of water which is maintained at about freezing temperature by virtue of its contact with the ice bed 39. The heat of the gaseous working fluid in the condenser 30 is given up to the shallow body of water 40 causing the fluid to condense. The body of water, in accepting this heat, causes more ice to melt above it. As the ice melts, the excess water formed is allowed to run out one or more spill vents 41 placed almost precisely at the same level as the ice/water interface making it impossible for water to climb above this point. In addition, the shallow body of water is kept cold by constant circulation under the large surface of ice which may be accomplished by one or more horizontally mounted propeller stirrers extending into the shallow body of water (not shown). Moreover, even melting of the ice takes place since the entire ice bed must descend as its lower surface melts; thereby no portion of the ice surface can melt faster than another because a faster melting portion would instantly find itself out of contact with the warmer water below it and hence would stop melting. Condensed working fluid in condenser 30 then passes to evaporator 14 via line 42 provided a sufficient gravity head is present to overcome the vapor pressure of the fluid in the evaporator.

Figure 3:
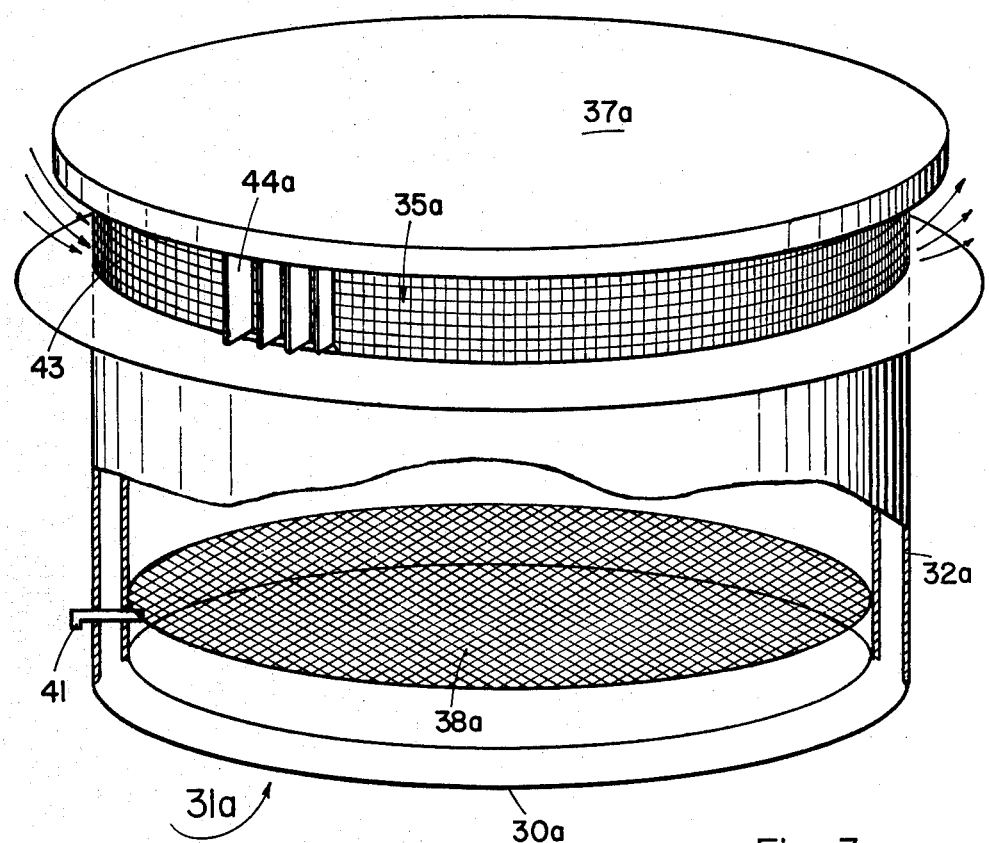
FIG. 3 is a perspective view of a circular underground reservoir usable with the system of FIG. 1.

FIG. 3 shows a perspective view of a circular underground reservoir 31a usable with the system of FIG. 1. Structural elements similar or identical to those of reservoir 31 of FIG. 1 are designated by the same reference numerals and the letter "a". The condenser and associated piping are not shown. The top wall 35a comprises one or more layers of mesh material 43 to allow passage of cold air from the ground surface to the reservoir and out a leeward wall as shown by the arrows. Located around the top wall is a series of spaced shutters 44a (four shown) hingedly connected to the mesh material. These shutters act as an air flow control means and may be selectively opened or closed with respect to the mesh material surface around different portions thereof to control air flow to and from the reservoir. The shutters may be comprised or covered with an insulating material such as styrofoam paneling. During warmer seasons they are closed completely against the top walls to help insulate the reservoir.

Figure 4:
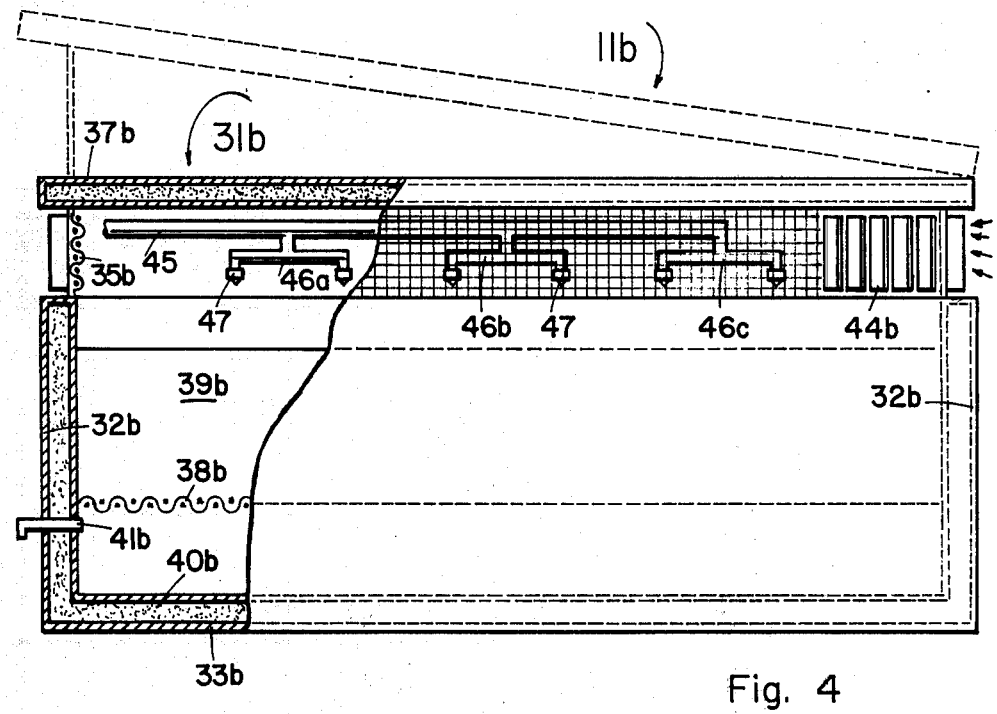
FIG. 4 is a side view of an above ground reservoir usable with the system of FIG. 1.

FIG. 4 shows a side view of an above ground ice reservoir 31b which may be employed in the system of FIG. 1 As in the case of FIG. 3, structural elements corresponding to those of reservoir 31 of FIG. 1 are indicated by the same reference numeral and the letter "b". Again the condenser and associated piping are not shown. The shutters of wall 35b as described in connection with FIG. 3 are shown by the reference numeral 44b. This embodiment also shows another apparatus for atomizing water to the reservoir. A main water conduit 45 carrying a water supply extends across cover 37b and is branched into three spray assemblies 46a, b and c, each comprising an inverted T pipe having an atomizer head 47 at each of their open ends. These heads 47 are nested in the cover surface to support their respective assemblies and the main conduit. Water sprayed through these heads is distributed evenly into the reservoir. A solar collector 11b shown by the dotted lines may be mounted atop the reservoir instead of being separately disposed away from the reservoir as shown in FIG. 1 or as an addition or substitute for the solar collector of FIG. 1.

Generally, whether the ice reservoir is built underground as in FIG. 3 or above ground as in FIG. 4, a cylindrically-shaped tank is useful for home use measuring 30 feet in diameter and 9 feet in depth. For commercial applications this size can be increased.

The thermodynamics of a Rankine cycle system as shown in FIG. 1 operating with an average hot water tank temperature of between about 60° C. and 80° C. (140° F. to 176° F.) and a condenser temperature of about 0° C. (32° F.) are such that two cubic feet of ice are required to produce one KwHr. of electrical energy. Assuming home use of this system, if the average American family uses about 300 KwHrs. of electricity per month, they will require 7200 cubic feet of ice per year. Because some of this ice is consumed as it forms in the winter, storage is only required for a ten month supply thereby reducing the storage demand to 6000 cubic feet. Such a reservoir with the dimensions so described meet this requirement. While the dimensions of the reservoir are flexible, the diameter in relation to depth must be such as to allow a practical rate of freezing. If the freezer is 30 feet in diameter and 9 feet in depth as previously described, the horizontal surface of the ice will be 707 square feet. If a modest estimate of thirty, twenty-four hour days of below freezing weather is expected, the freezing rate would have to be 0.15 inches per hour to fill the nine foot depth of the freezer with ice. At this rate of filling 66 gallons of water per hour must be frozen and 20,000 Kilocalories of heat rejected to the air in the process. This amount of heat can increase the temperature of two and one half million cubic feet of air by one degree Centrigrade.

To allow for sufficient ventilation without the use of power equipment, a top wall design as shown in FIGS. 3 and 4, making use of a wind blowing in any direction, is of high value. As an example, the ventilated top wall surface area of the 6000 cubic foot tank can be 188 ft$^2$. Since this area is taken at the circumference of the reservoir, a breeze, coming from any horizontal direction, enters through half of this area and exits through the other half. If a five mile per hour wind is blowing, the amount of air passing through the freezer will be on the order of $5,280 \times 94 = 0.5 \times 10^6$ cubic feet of air per hour. At this rate, a temperature increase of five degrees Centrigrade is experienced by the air as it passes through the freezer. If conditions are such that a wind force is not present, then forced ventilation by means of a fan may be employed.

To maximize the rate of heat transfer to the air, the water is sprayed through by atomization. This spraying technique also circulates the air and allows a portion of the water to freeze before settling to the surface of the ice below. The tiny crystals of ice, formed before settling to the surface of the ice block, serve an important function as seed crystals, thereby hastening the freezing of the thin water film. Without these crystals, the film tends to supercool somewhat, retarding the freezing rate. The addition of a small amount of a surfactant to the water can also hasten the freezing process by reducing the droplet size as well as the water's film thickness. Freezing point depressants such as inorganic salts, e.g. calcium chloride, may be added to the ice bed to lower the ice temperature after formation.

The primary purpose of the insulated side and bottom walls and cover is to protect the so-formed ice from warm melting temperatures and to give shape to the ice during the freezing process. During the freezing process there is never more than a thin film of water present, so, at no time, is the reservoir subjected to any appreciable hydrostatic stress.

The reservoir must be slowly filled with water during the winter and this water must be frozen by constant circulation of available frigid air. After the freezing cycle is over or on a warm winter day, the container is sealed off by securing the shutters to stop the flow of air thereby preventing melting.

Figure 5:
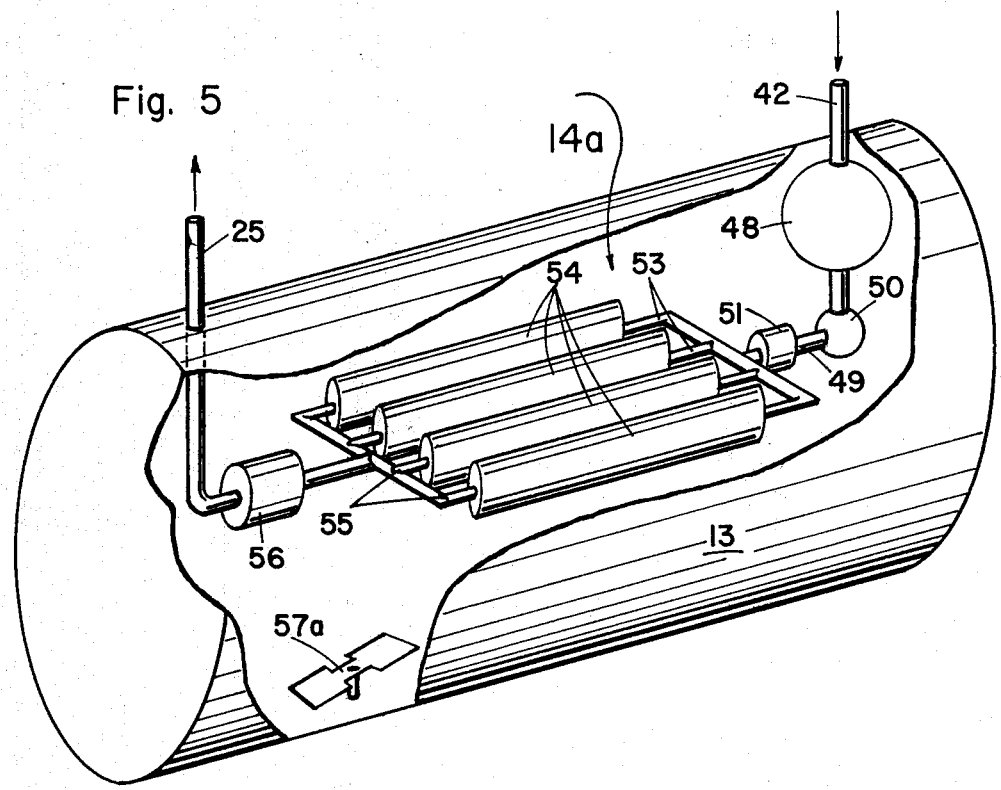
FIG. 5 is a side view of an evaporator assembly according to the invention comprising a plurality of evaporator elements.

FIG. 5 shows a perspective side view of a preferred evaporator assembly which can be used with the system of FIG. 1. The evaporator assembly 14a is shown nested within water tank 13. Condensed working fluid from line 42 is introduced to fluid reservoir 48 where a pressure head of liquid is established. This fluid under pressure enters line 49 via automatic throttle valve 50 where it is then passed to fluid manifold 51. This valve can be electrically connected with the load and generator to respond automatically to the demand placed upon the turbine or other heat engine of the system. As more or less energy output is demanded, the throttle valve responds by either supplying more or less working fluid. Fluid from the manifold 51 is split to inlet branch lines 53 which connect to each of a plurality of evaporator elements 54 where evaporation of the working fluid occurs. The evaporator elements are slightly spaced apart to allow convection currents of heated primary fluid in the water tank to circulate around the elements. Vaporized working fluid exits each element through exit branch lines 55 to vapor manifold 56 and then to conduit 25 for introduction to the turbine or other heat engine. Forced circulation of primary fluid may be accomplished by means of a motor driven propeller 57a located at the bottom of the tank.

Figure 6A:
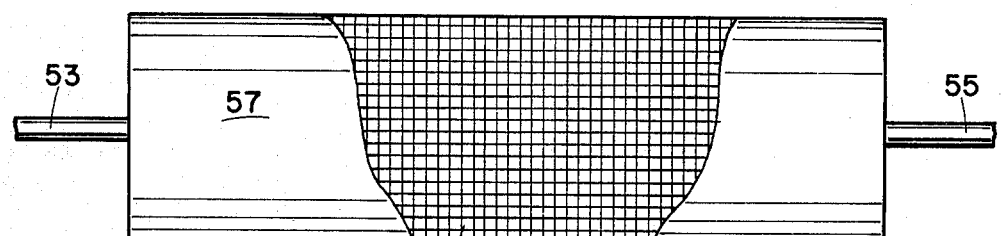
FIGS. 6A and 6B illustrate an evaporator element as shown in FIG. 5.
Figure 6B:
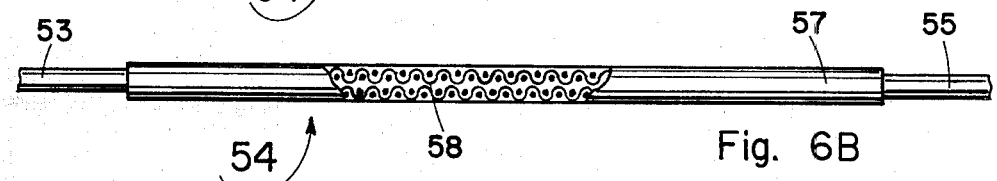

FIG. 6A is a sectioned side view of an evaporator element 54 of FIG. 5. FIG. 6B shows a top view of such element. The element comprises an oval container having a thin outer shell 57 preferably made of aluminum having a thickness of about 0.01". Generally the maximum diameter D of the element is about 5" to 6" and the minimum diameter d is about $\frac{1}{2}$" to $\frac{3}{4}$". The space within the shell is packed with several layers of fluid dispersing material 58 which can be common window screen, for example. Working fluid entering the evaporator element through inlet branch line 53 is vaporized and exits through branch line 55. As the fluid enters the evaporator element it encounters the mesh material and is forced to disperse in a thin film over the interior surface of the shell thereby enhancing heat transfer from the boiler. As the fluid is converted to a vapor, it superheats in its path through the evaporator element before being passed to the turbine or heat engine.

The working pressure across the turbine is about one atmosphere, the evaporator pressure is about 14.7 PSIA and the condenser pressure is about 3 PSIA.

Because, the pressure differential between the primary fluid in the water tank 13 and the working fluid in each evaporator element is negligible and the temperatures employed are sufficiently low to prevent any significant thermal stress, the shell 52 of the evaporator element functions as a partition rather than as the wall of a pressurized vessel. With the restriction of high pressure and high temperature removed, thin materials can be used for the shell and hence the rate of heat transfer becomes so rapid that even materials not normally considered good conductors of heat can be used such as plastics. However, thin heat conductive metals such as aluminum or copper are preferred.

The layers of fluid dispersing material 50 serve the primary purpose of offering a means of dispersing incoming fluid to a thin film to increase heat transfer efficiency. However, such material also serves to supply rigidity and hence dimensional stability to the element itself, and prevents collapse of the element shell by the vacuum formed during shutdown or slowdown of the system. Other fluid dispersing materials include screens and coils.

Figure 7A:
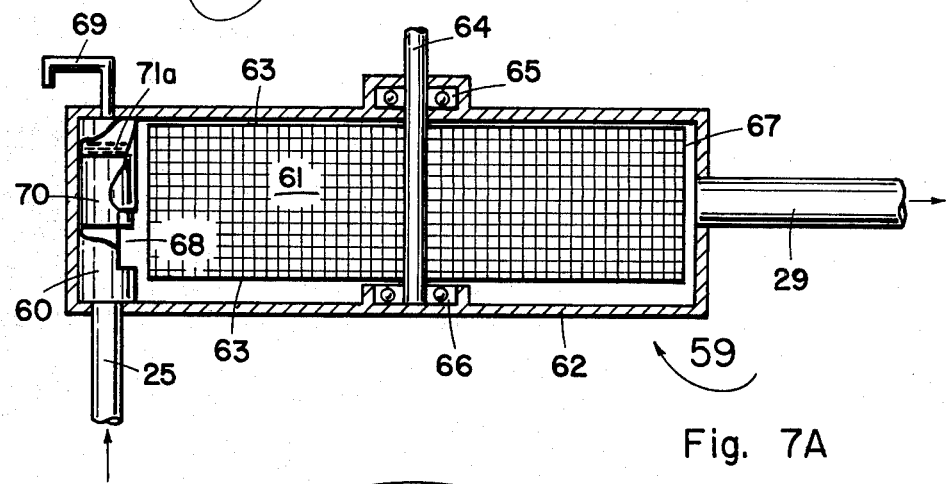
FIGS. 7A and 7B show a side view and top view, respectively, of a turbine assembly including a piston-operated regulating valve and turbine according to the invention.
Figure 7B:
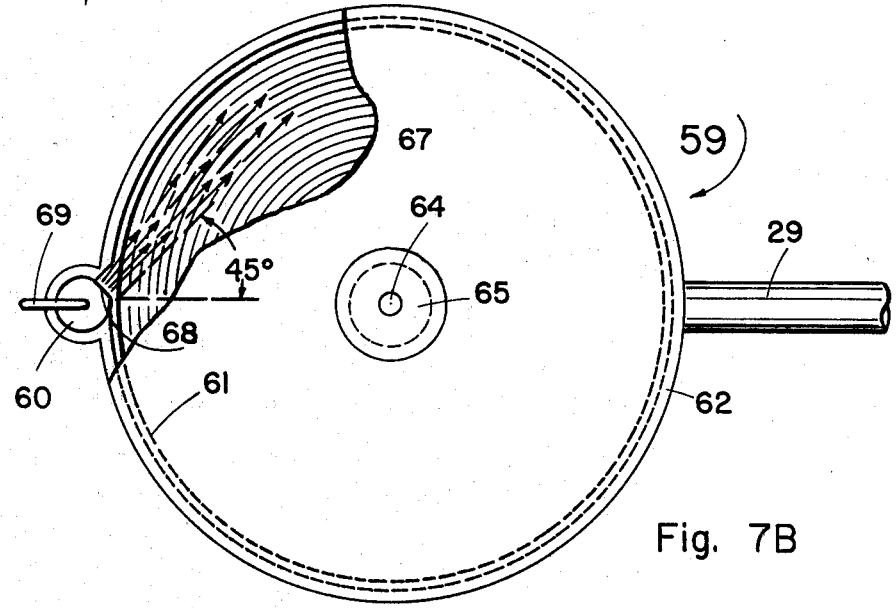

FIG. 7A and 7B show a side view and top view of a preferred turbine assembly apparatus useful as the turbine 26 of FIG. 1. Heretofore, prior art turbines employed a plurality of blades, fins or buckets on a rotor against which a high velocity stream of gas or liquid impinged to spin the rotor. The present turbine design, instead of deriving its power from a high velocity impact, functions by the deceleration of a gas impinging on it. The turbine design of FIG. 7 accomplishes this deceleration by allowing a directed stream of gas to pass through it rather than by using the impact concept.

The turbine assembly is indicated by 59 and is connected with inlet conduit 25 and outlet 29 as shown in FIG. 1. The assembly consists of a piston-operated regulating valve 60 and a turbine 61 housed within casing 62. The turbine comprises a pair of spaced circular metal plates 63 centrally mounted on turbine shaft 64. The shaft 64 is rotatably supported in the casing by outer casing bearing 65 and inner bearing 66. Inner bearing 66 can also be a wafer bearing recessed into the lower wall of the casing. Between the metal plates and extending concentrically from the shaft to the periphery of the plates around their entire circumference are layers of mesh material 67 such as window screen or wire mesh. Vaporized working fluid in conduit 25 enters valve 60 and is introduced to the turbine 61 through an elongated inlet 68 which is positioned to direct vapor against the mesh material 67 between the shaft and periphery of the plates, for example at an angle of 45° from a theoretical radial line connecting the shaft and valve. As the vapor penetrates the first few outer layers of mesh material, its velocity is reduced by transferring part of its entry velocity to the turbine and shaft. Because the succeeding inner layers have a lower tangential velocity than the outer layers, the gas is able to transfer more of its kinetic energy to the relatively slow moving mesh material. The process is continued until the kinetic energy of the gas has been transferred to the turbine shaft. Conventional turbines generally require several stages to accomplish this same effect.

Because it is essential that the evaporator of the system experience no positive pressure with respect to the atmosphere, regulating valve 60 is built into the turbine assembly. The regulating device automatically senses any difference in pressure between the evaporator and the atmosphere and eliminates it by regulating the rate of vapor flow to turbine 61. The device comprises a cylindrical container having a vent line 69 extending outside the casing 62 to the atmosphere. A piston 70 is slidably mounted in the container and can move vertically to constrict or enlarge the elongated inlet 68 thereby increasing or decreasing flow to the turbine. A layer of oil 71a covers the piston 70 to provide a seal to the atmosphere.

Figure 11:
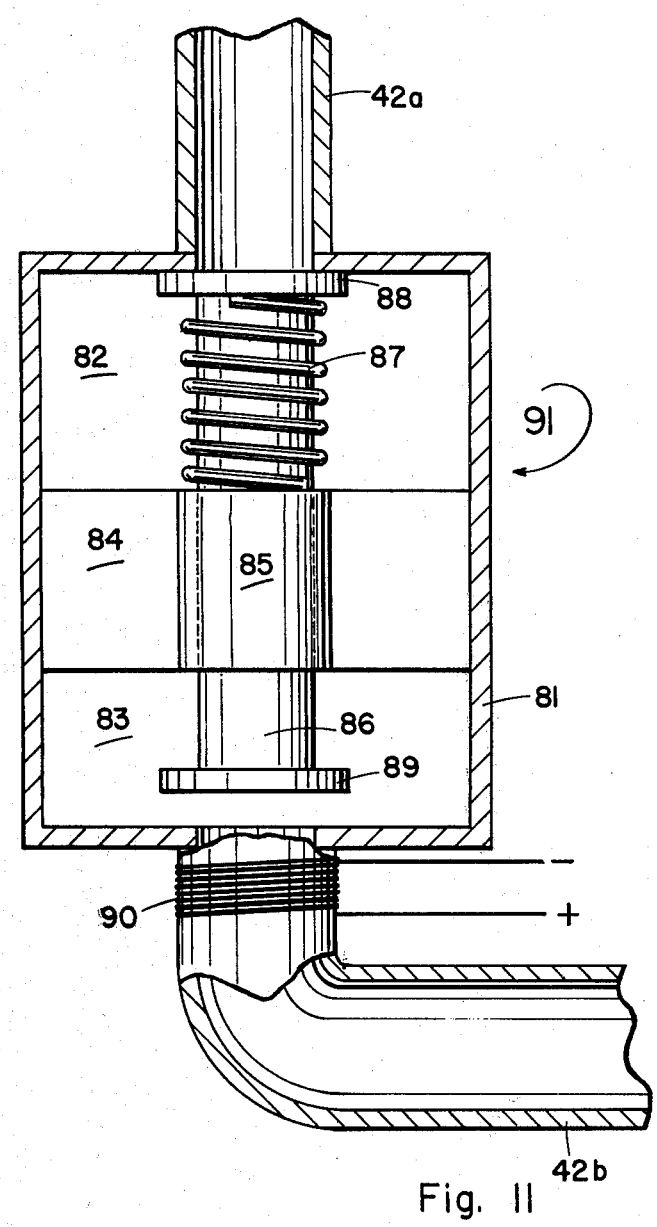
FIG. 11 shows a side view of a magnetically-activated pump for supplying condensed working fluid to an evaporator.

When the system is running and the demand for power suddenly increases through increased loads, the throttle control valve 50 of FIG. 11, sensing this increased load, increases the flow rate of working fluid into the evaporator assembly. Ordinarily this would quickly lead to an over pressure in the evaporator if the enlarged volume of gas was not supplied with a larger vent to the turbine. As the pressure in the evaporator begins to increase with reference to atmospheric pressure, the piston 70 of regulating valve 60, exposed at one end to the evaporator and at the other end to the atmosphere, experiences a net force in the upward direction causing it to move upwardly. As the piston moves upwardly it exposes more of vapor inlet 68 and a greater volume of gas flows into the turbine and increases the power output. If less of the inlet is exposed, the gas flow is reduced and turbine power is also reduced. The velocity of the turbine is constant; only the torque changes. During normal operating conditions the piston maintains a preset position in the container at which the inlet 68 is exposed sufficiently to run the turbine at normal speeds.

Most pressure or velocity compounded turbines have considerable mass and therefore experience high centrifugal forces when run at high velocity which can lead to metal fatigue or fracture resulting in complete destruction of the turbine. Because of this, most turbines are periodically shut down and examined. Since the mass of the frictional deceleration turbine described in FIGS. 7A and 7B is much less than ordinary turbines, even at tremendous velocities very little stress is placed upon the turbine wheel, shaft, and bearings. This feature may also be applied to high temperature gas turbines where many metals are ineffective because of their loss of strength at high temperatures. Also the dynamics of the surface can achieve high efficiency in a single stage, whereas conventional turbines require multiple stages for high efficiency.

Figure 8:
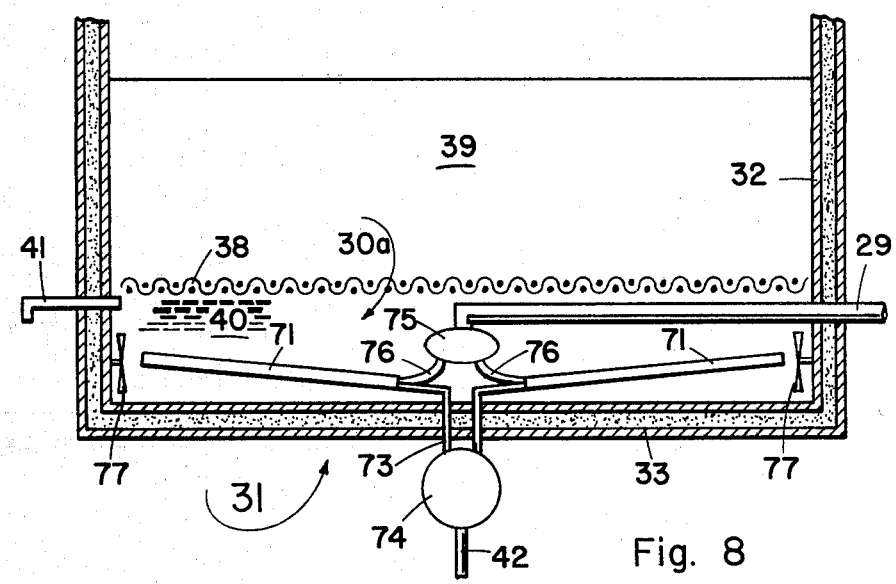
FIGS. 8 and 9 show a side view and top view, respectively, of a condenser assembly according to the invention.
Figure 9:
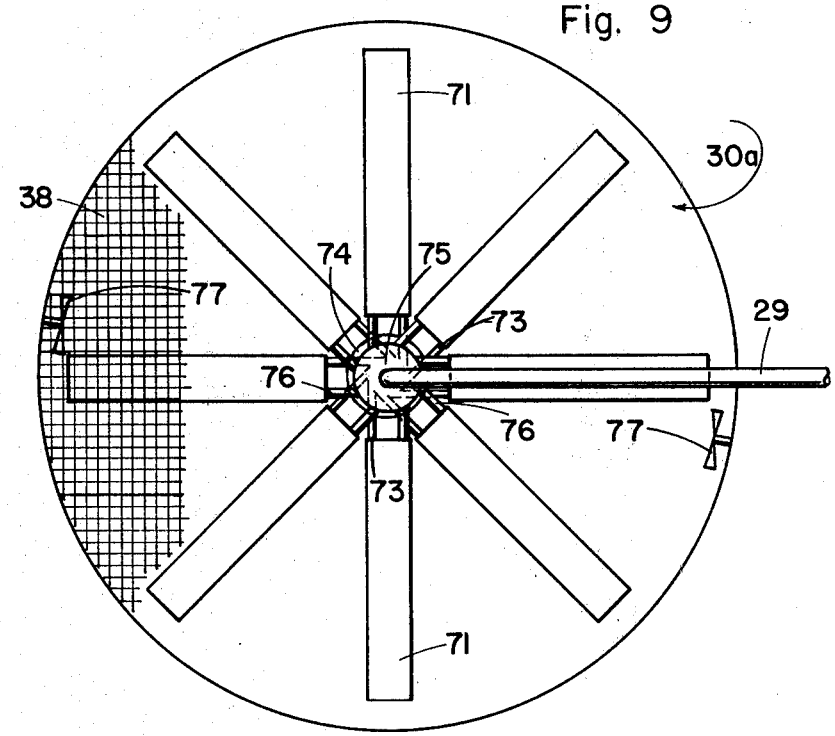

FIGS. 8 and 9 show a side view, respectively, of a preferred condenser assembly for use in connection with the Rankine cycle system of FIG. 1. The assembly is shown lying in the shallow body of water 40 between grate 38 and bottom wall 33 of ice reservoir 31. A spill vent 41 is also shown. The condenser assembly consists of a plurality of condenser elements 71 arranged in a radial pattern and tilted slightly downward to allow drainage into common condensate manifold 74 via individual outlets 73. The structure of each condenser element may be the same as the evaporator elements described in FIGS. 6A and 6B. From manifold 74 the condensate is sent to the evaporator in line 42. Vapor manifold 74 is located above and between the condenser elements which receives vaporized working fluid from turbine exhaust line 29. A plurality of vapor inlet lines 76 distribute vaporized working fluid to each condenser element 71 where condensation takes place. A pair of vertically mounted propeller stirrers 77 may be located in the water space to circulate water around the condenser elements.

Figure 10:
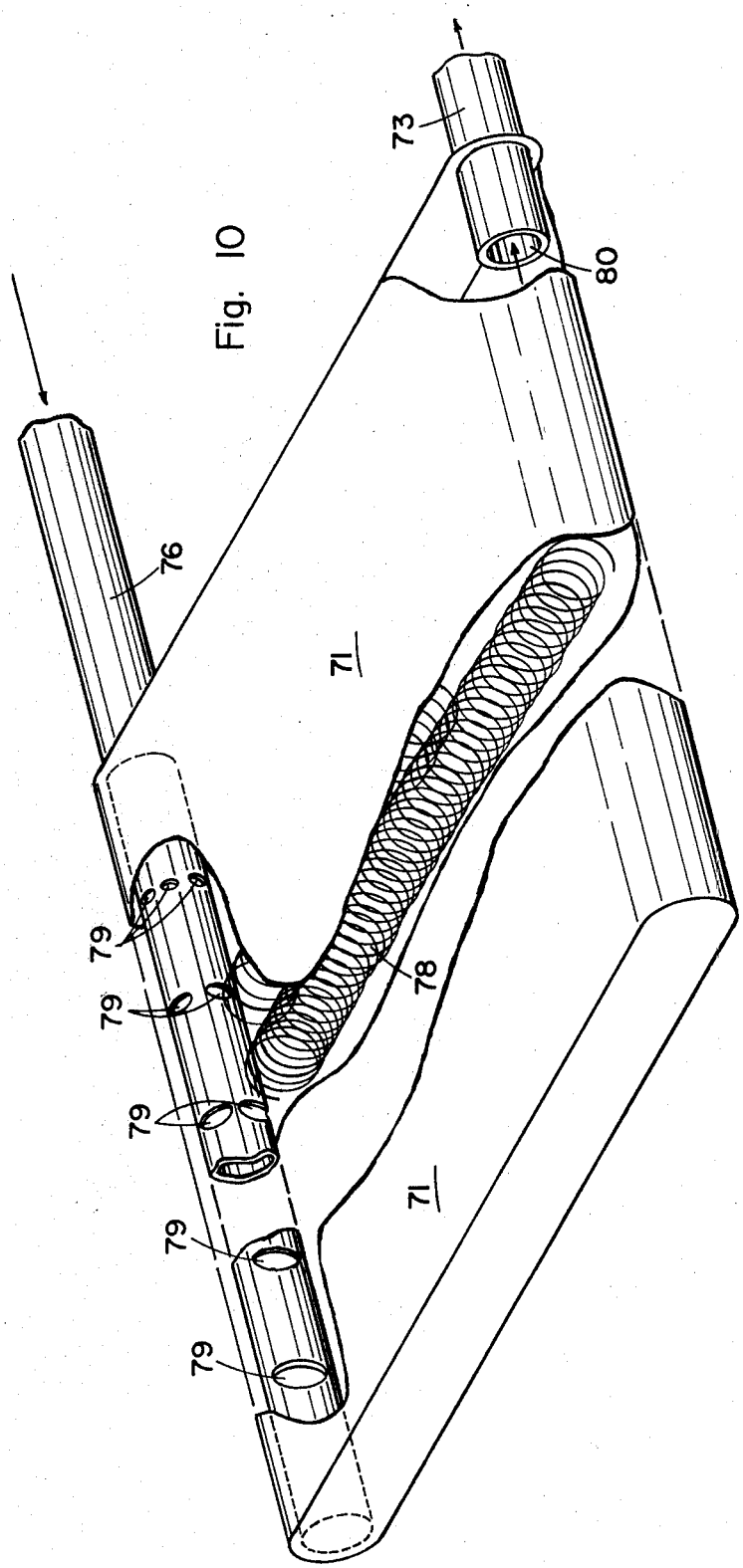
FIG. 10 shows a condenser element of the condenser assembly of FIGS. 8 and 9.

FIG. 10 shows a preferred condenser element 71 comprising a flat container having packed within it a fluid dispersing material 78 consisting of a plurality of coiled springs extending across the width of the element. Such material disperses vaporized working fluid in the element to allow efficient cooling and condensing to the liquid state and also helps maintain the structural integrity of the element itself. Inlet line 76 carrying vaporized working fluid extends through one side of the element 71 having a plurality of rows of perforations 79 increasing in size with the path of gas flow. The increasing size of the perforations allow substantially the same amount of vapor to be introduced to all portions of the element by accomodating for pressure drops between successive rows of perforations. Outlet line 73 to the fluid manifold 74 is located at the opposite side of element 71 having exit port 80 for withdrawal of condensed fluid.

FIG. 11 shows a condensate pump 91 which may be used for supplying condensed working fluid from a condenser such as shown in FIG. 8 to an evaporator as shown in FIG. 5. The pump is located in line 42 between the condenser and evaporator and is especially useful when there is an insufficient gravity head of condensed working fluid to overcome the fluid pressure in the evaporator. Line 42a indicates the condensate side of the pump and line 42b the evaporator side.

The valve comprises a hollow housing separated into upper and lower compartments 82 and 83, respectively, by transverse member 84. Centrally located in the housing and supported by transverse member 84 is sleeve 85. Rod 86 extends through sleeve 85 for vertical movement and is biased upwardly by spring 87. Spring 87 may be eliminated since the pressure in line 42b to the evaporator will always be greater than in line 42a from the condenser to provide biasing upwardly. Upper plate 88 is mounted on the top of rod 86 and is capable of sealing off fluid flow from line 42a to chamber 82 when the rod moves upwardly. Lower plate 89 is comprised of a magnetic material and is mounted on the lower end of rod 86 and is capable of sealing off fluid flow from chamber 83 to line 49. An electric coil 90 surrounds line 49 adjacent to the valve and is connected by appropriate wiring to a circuit means which provides a predetermined intermittent current flow. Current is intermittently applied to the coil to create a fluctuating magnetic field at line 49 drawing the lower plate 89 downward to seal chamber 83.

The operation of the pump is as follows. When there is no current to the coil, the spring 87 biases the rod 86 upwardly and no condensed working fluid is admitted to chamber 82. When the coil is energized, plate 89 is attracted downwardly and the rod moves downwardly, allowing condensate to be introduced to chamber 82 through line 42 and then through the space between the sleeve and rod to lower chamber 83. When the coil is deenergized rod 86 again moves upwardly, admitting condensed working fluid to line 49 (and then to condensate manifold 51) while stopping condensate flow through the valve. Thus a pulsing flow of condensate to the evaporator is achieved.

I claim:

1. In a Rankine cycle system comprising a heat source, a primary fluid heated by said heat source, a boiler for containing said primary fluid, an evaporator containing a working fluid in contact with said heated primary fluid, said working fluid being vaporized in said evaporator, a device for converting a portion of the thermal and kinetic energy of said vaporized working fluid to work, and a condenser associated with a cold source for condensing vaporized working fluid exhausted from said device, said condensed fluid being introduced to said evaporator, the improvement which comprises a cold source comprising:
   (a) an insulated container;
   (b) means for permitting a flow of cold external air to said container;
   (c) means for spraying water into said container; and
   (d) a grate extending across said container and defining a space for containment of a body of water therebelow, said condensor being submerged in said body of water, whereby ice formed in said container by contact of said cold external air and said sprayed water is retained by said grate and interfaces with said body of water at about the level of said grate.

2. The cold source of claim 1 wherein said container further comprises means for controlling the flow of external air to said reservoir.

3. The cold source of claim 1 wherein said container further comprises means for maintaining the level of said body of water at said interface.

4. In a Rankine cycle system comprising a heat source, a primary fluid heated by said heat source, a boiler for containing said primary fluid, an evaporator containing a working fluid in contact with said heated primary fluid, said working fluid being vaporized in said evaporator, a device for converting a portion of the thermal and kinetic energy of said vaporized working fluid to work, and a condenser associated with a cold source for condensing vaporized working fluid exhausted from said device, said condensed fluid being introduced to said evaporator, the improvement which comprises a cold source comprising:

(a) an insulated container;
(b) means for permitting a flow of cold external air to said container;
(c) means for spraying water into said container;
(d) a grate extending across said container and defining a space for containment of a body of water therebelow, said condensor being submerged in said body of water, whereby ice formed in said container by contact of said cold external air and said sprayed water is retained by said grate and interfaces with said body of water at about the level of said grate; and
(e) means for maintaining the level of said body of water at said interface.

5. The cold source of claim 4 wherein said container further comprises means for controlling the flow of external air to said reservoir.

6. In a Rankine cycle system comprising a heat source, a primary fluid heated by said heat source, a boiler for containing said heated primary fluid, an evaporator containing a working fluid in contact with said heated primary fluid, said working fluid being vaporized in said evaporator, a device for converting a portion of the thermal and kinetic energy of said vaporized working fluid to work, and a condenser associated with a cold source for condensing vaporized working fluid exhausted from said device, said condensed fluid being introduced to said evaporator, the improvement which comprises a cold source comprising;

(a) a reservoir having an insulated side wall and an insulated bottom;
(b) a ventilated top wall mounted above said side wall, said top wall permitting a flow of external air into and out of said reservoir;
(c) means associated with said top wall for controlling flow of external air to said reservoir;
(d) an insulated cover mounted on said top wall;
(e) a grate extending across said reservoir above said bottom defining a space for containment of a body of water, said condenser being submerged in said body of water; and
(f) means associated with said reservoir for spraying water into said reservoir, whereby an ice bed is formed in said reservoir above said grate during cold seasons by allowing cold air to flow through said wall through operation of said control means while admitting water into said reservoir through said spray means until said bed of ice is formed; said bed being in contact with said body of water below said grate; and whereby said ice bed is maintained in said reservoir in warm seasons by operation of said control means to prevent flow through said walls.

7. The cold source of claim 6 wherein said control means is comprised of an insulating material.

8. The cold source of claim 6 wherein said spraying means is at least one atomizer.

9. The cold source of claim 6 which further comprises at least one spill vent located in said space comprising a conduit extending from said space to the outside of said reservoir.

10. The cold source of claim 6 which further comprises a stirring means located in said space for circulating said body of water.

* * * * *